Jan. 11, 1944.    L. H. CUSACK    2,339,155
BICYCLE TRAILER HITCH
Filed Nov. 27, 1941
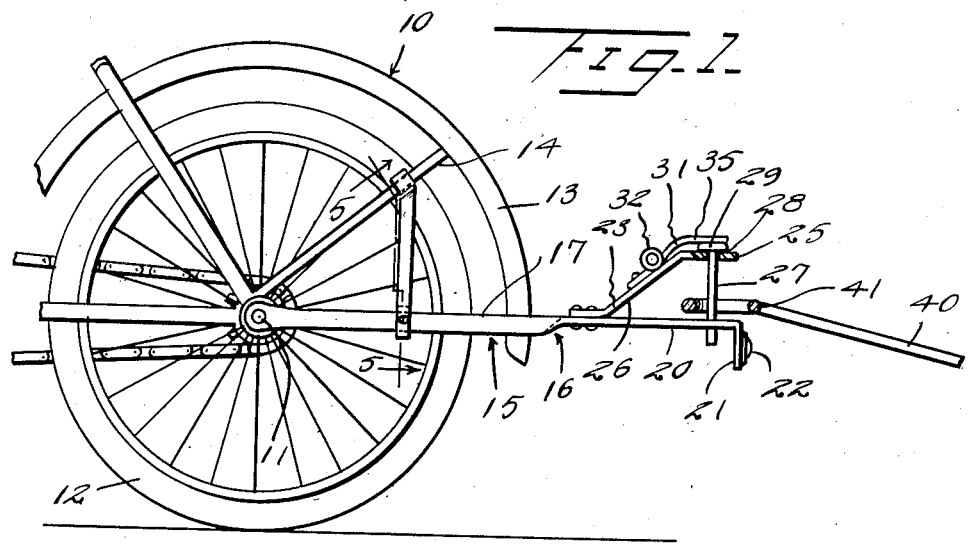
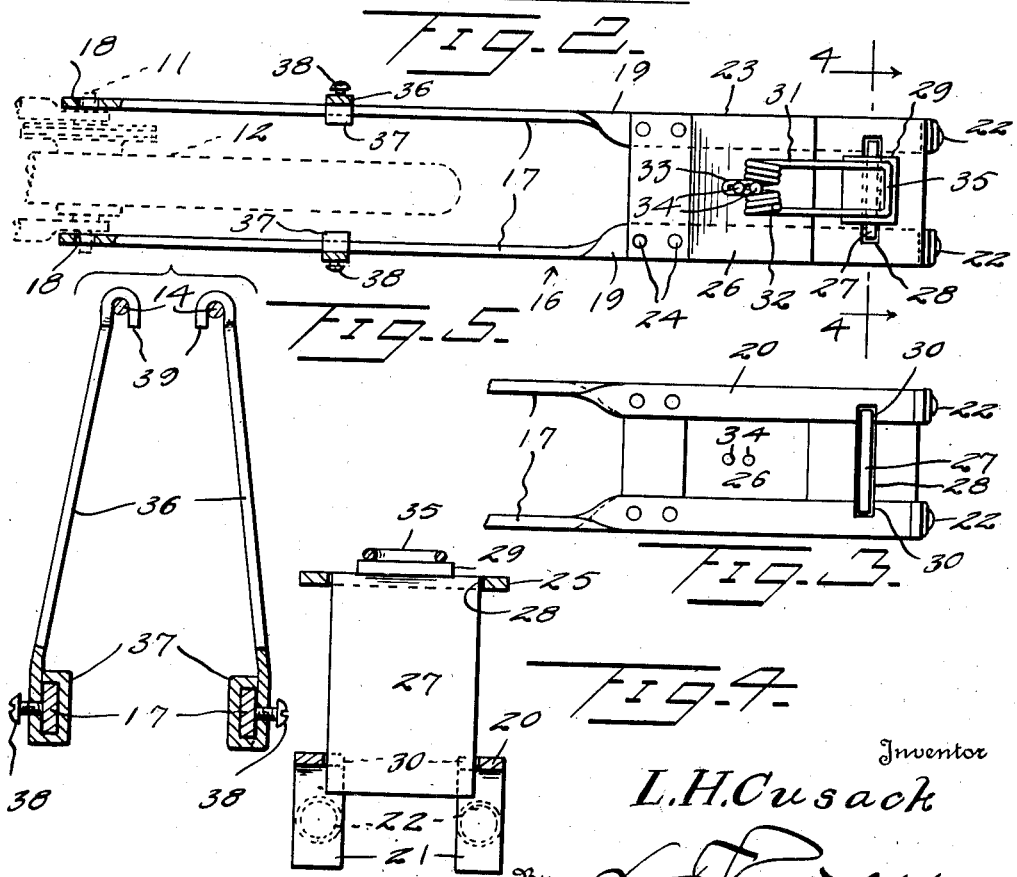
Inventor
L. H. Cusack Patented Jan. 11, 1944

2,339,155

UNITED STATES PATENT OFFICE 2,339,155

BICYCLE TRAILER HITCH

Leland H. Cusack, Fulton, N. Y.

Application November 27, 1941, Serial No. 420,708

1 Claim. (Cl. 280—204)

This invention relates to a trailer hitch or coupling for bicycles, and more particularly to a hitch of simple construction capable of being quickly and easily applied to or removed from a bicycle and adapted to be used for connecting a trailer vehicle, such as a wagon, to the bicycle to be drawn thereby.

A further aim of the invention is to provide a hitch to which the tongue of a trailer vehicle can be quickly and easily attached or removed and which will effectively hold a tongue connected to the hitch.

Other objects and advantages of the invention will hereinafter become more fully apparent from the following description of the drawing, which illustrates a preferred embodiment thereof, and wherein:

Figure 1 is a side elevational view of the hitch or coupling shown applied to the rear end of a bicycle, Figure 2 is a top plan view, partly in section of the same, Figure 3 is a bottom plan view of the rear end of the hitch, Figure 4 is a cross sectional view taken substantially along the plane of the line 4—4 of Figure 2, and Figure 5 is a transverse sectional view through the hitch taken substantially along the plane as indicated by the line 5—5 of Figure 1.

Referring more particularly to the drawing, wherein like reference characters designate like or corresponding parts throughout the different views, 10 designates generally the rear part of a conventional bicycle, including a rear axle 11 on which is mounted a rear wheel 12 having a fender 13 provided with a fork shaped supporting brace 14. These parts are of conventional construction and are shown and described merely to better illustrate the application of the hitch or coupling, designated generally 15 and comprising the invention.

The hitch or coupling 15 includes a fork, designated generally 16 and which includes a pair of corresponding bars 17 having openings 18 at their forward ends to receive ends of the axle 11. The bars 17 extend rearwardly from the axle 11 on the opposite sides of the wheel 12 and fender 13. Rearwardly of the fender 13, the bars 17 are twisted, as seen at 19, to position the sides thereof, rearwardly of the twists 19 in substantially the same horizontal plane. The terminal ends of these horizontal portions 20 are turned downwardly, as seen at 21, and are preferably provided with red reflector elements 22 on the outer sides thereof and which face rearwardly. A plate 23 is attached at its forward end by fastenings 24 to the bar portions 20, adjacent the forward ends thereof. The plate 23 is provided with an upwardly offset rear end 25 and a downwardly and forwardly inclined intermediate portion 26.

A coupling plate 27 slidably engages a transverse slot 28 in the portion 25 and is provided with a head 29 at its upper end which is adapted to rest on the upper side of the portion 25 for supporting the plate 27 in a position, as seen in Figure 1. The bar portions 20, as best seen in Figure 3, are provided with inwardly opening notches 30 for slidably receiving the lower portions of the side edges of the plate 27. A spring 31 includes a coil 32 having an intermediate portion 33 which is connected by fastenings 34 to the upper side of the inclined portion 26. A U-shaped spring arm 35 has legs which form continuations of the ends of the coil 32 and said spring arm is bent, intermediate of its ends to substantially conform to the angular relationship of the portions 25 and 26. The free end of the spring arm 35 bears on the head 29 for urging the plate 27 downwardly so as to hold it in its position of Figure 1.

A pair of hangers 36 have lower portions 37 which engage around and are slidably mounted on the forward portions of the bars 17 and which carry set screws 38 for adjustably securing the hangers 36 to the forward ends of the bars 17. The hangers 36 are provided with inturned, forwardly bent hook shaped upper ends 39 which are adapted to engage over the legs of the fork 14 for supporting the fork 16 in substantially a horizontal position.

The hitch 15 is adapted to be attached to a tongue 40 of a wagon or other vehicle to be drawn by the bicycle and said tongue is provided at its forward end with a handle or eye 41 which is adapted to be disposed between the bar portions 20 and the upwardly offset portion 25 and through which the plate 27 is adapted to extend. It will be readily obvious that the spring arm 35 can be drawn upwardly for permitting the plate 27 to be raised to disengage it from the eye or handle 41 or for engaging it therewith for quickly and easily connecting the bicycle to the trailer vehicle, not shown, or for detaching it therefrom.

Various modifications and changes are contemplated and may obviously be resorted to, provided they fall within the spirit and scope of the invention as hereinafter defined by the appended claim, as only a preferred embodiment of the invention has been disclosed.

I claim as my invention:

A trailer hitch comprising a pair of bars connected to the rear axle of a bicycle and extending rearwardly therefrom, a plate attached to said bars at one end behind the bicycle, said plate having an upwardly offset rear end provided with a transverse slot, a coupling member slidably mounted in the slot, said bars having notches for slidably and detachably receiving the lower part of the coupling member, a head on the upper end of the coupling member for engaging the upper face of said offset end, said coupling member being adapted to extend through the eye of a draft tongue, and spring means mounted on said plate and extending over and engaging the head for urging the coupling member downwardly.

LELAND H. CUSACK.